(12) United States Patent
Hull (10) Patent No.: US 7,369,127 B1
(45) Date of Patent: May 6, 2008

(54) DYNAMIC CONTROL OF GRAPHIC REPRESENTATIONS OF DATA

(75) Inventor: Doug Hull, Orleans, MI (US)

(73) Assignee: The MathWorks, Inc., Natick, MA (US)

( * ) Notice: Subject to any disclaimer, the term of this patent is extended or adjusted under 35 U.S.C. 154(b) by 443 days.

(21) Appl. No.: 10/914,819

(22) Filed: Aug. 9, 2004

Related U.S. Application Data (60) Provisional application No. 60/569,272, filed on May 6, 2004.

(51) Int. Cl.
*G06T 11/20* (2006.01)
(52) U.S. Cl. ........................... 345/440; 715/502
(58) Field of Classification Search ............... 345/440, 345/440.1; 715/974, 964, 502
See application file for complete search history.

(56) References Cited

U.S. PATENT DOCUMENTS

| 6,064,401 | A | * | 5/2000 | Holzman et al. ........... 345/440 |
| 6,559,868 | B2 | * | 5/2003 | Alexander et al. .......... 715/781 |
| 7,084,872 | B2 | * | 8/2006 | Etgen et al. ................ 345/440 |
| 2002/0008702 | A1 | * | 1/2002 | Gilbert .................. 345/440.1 |
| 2002/0080150 | A1 | * | 6/2002 | Nakatani .................... 345/660 |
| 2005/0162423 | A1 | * | 7/2005 | Goggin ....................... 345/440 |

\* cited by examiner

*Primary Examiner*—Kee M. Tung
*Assistant Examiner*—Michelle K. Lay
(74) *Attorney, Agent, or Firm*—Lahive & Cockfield, LLP (57) ABSTRACT

The present invention provides user selections to control of one or more graphical representations of data in a graphical display. User selections can include parts of the graphical display, such as tick marks, offset bars scale values, combination bars and/or the graphical representations themselves. Repositioning and resealing of the graphical representations may be performed without rescaling of the underlying data. Multiple series of data may be viewed and quickly moved and/or rescaled to determine trends and/or relationship between and/or among the series of data.

34 Claims, 9 Drawing Sheets

DYNAMIC CONTROL OF GRAPHIC REPRESENTATIONS OF DATA

RELATED APPLICATIONS

The present application claims priority to a U.S. provisional application, Patent Application No. 60/569,272, filed May 6, 2004, the contents of which are incorporated herein by reference.

FIELD OF THE INVENTION

The present invention relates to the display of graphical information. Specifically, a graphical display of one or more series of data may be interactively rescaled to aid in graphical interpretation of the data.

BACKGROUND OF THE INVENTION

Graphical display of data can aid in interpretation of the data and detection of trends or relationships among series of data. Typically, scaling of the data is necessary in order to properly display data in a graph. When multiple series of data are to be displayed on the same graph, scaling can become more difficult. Improper scaling of the data can hide variations in the data. Also, positioning of the data series can aid in ease of comparison among series of data. The need to fit all the data onto the same graph, while maintaining legibility of the data, can become difficult with many data series.

Data can be obtained from a wide variety of sources. For example, spreadsheets, databases, accounting programs and other computer programs can provide data for graphical display. Also, professionals from diverse areas such as engineering, science, education, and economics build mathematical models of dynamic systems in order to better understand system behavior as it changes with the progression of time.

The field of telemetry often involves multiple series of data. Graphical displays are used to determine qualitative relationships between different signals, each expressed in a series of data. However, these graphical displays can be difficult to read and to create. Typically, these plots cannot be interactively manipulated. A parameter file is used which gives the locations and scales of each signal. This parameter file is often created through many iterations of trial and error. Once created, the same parameter file is often used for similar data, as the effort required to change the parameter file is substantial.

SUMMARY OF THE INVENTION

There is a need for control of a graphical display of one or more series of data to provide for ease of viewing of the data and optional comparison among multiple series of data. The present invention is directed toward further solutions to address this need. The present invention may be useful in the design of any type of graphical display of data in which the display involves at least one axis.

In accordance with one aspect of the present invention, in an electronic device or a medium holding electronic device executable steps for a method, the method includes providing a graphical display including a graphical representation of a group of data. A user selection is provided to correspond to an axis to change the graphical representation of the group of data by movement of the user selection relative to the axis.

In another aspect of the invention, a medium holding electronic device executable steps for a method is provided. A graphical display is provided that includes a graphical representation of a group of data. A first scale value is provided that corresponds to a first value proximate to a location of the first scale value on an axis. Editing the first scale value to a second value changes the first value at the same location on the first axis to the second value.

In another aspect of the invention, a medium is provided for holding electronic device executable steps for a method. A graphical display is provided that includes a graphical representation of a group of data. In this embodiment, a lower tick mark and/or an upper tick mark are provided to rescale the graphical representation of the group of data within the graphical display.

In another aspect of the invention, a medium is provided for holding electronic device executable steps for a method. A graphical display is provided that includes a graphical representation of a group of data. In a first variation, an offset bar is provided to move a scale bracket without rescaling the graphical representation of the group of data within the graphical display. In a second variation, a combination bar is provided to move a scale bracket without rescaling the graphical representation of the group of data within the graphical display and without moving the graphical representation of the group of data within the graphical display.

BRIEF DESCRIPTION OF THE DRAWINGS

The present invention will become better understood with reference to the following description and accompanying drawings, wherein.

DETAILED DESCRIPTION

An embodiment of the invention provides a graphical display to let users interactively (i.e. dynamically) rescale the display of data to provide a desired display of the data. The present invention can be particularly useful when simultaneously analyzing multiple series of data to determine trends and/or relationships within or among the series of data.

Figure 1:
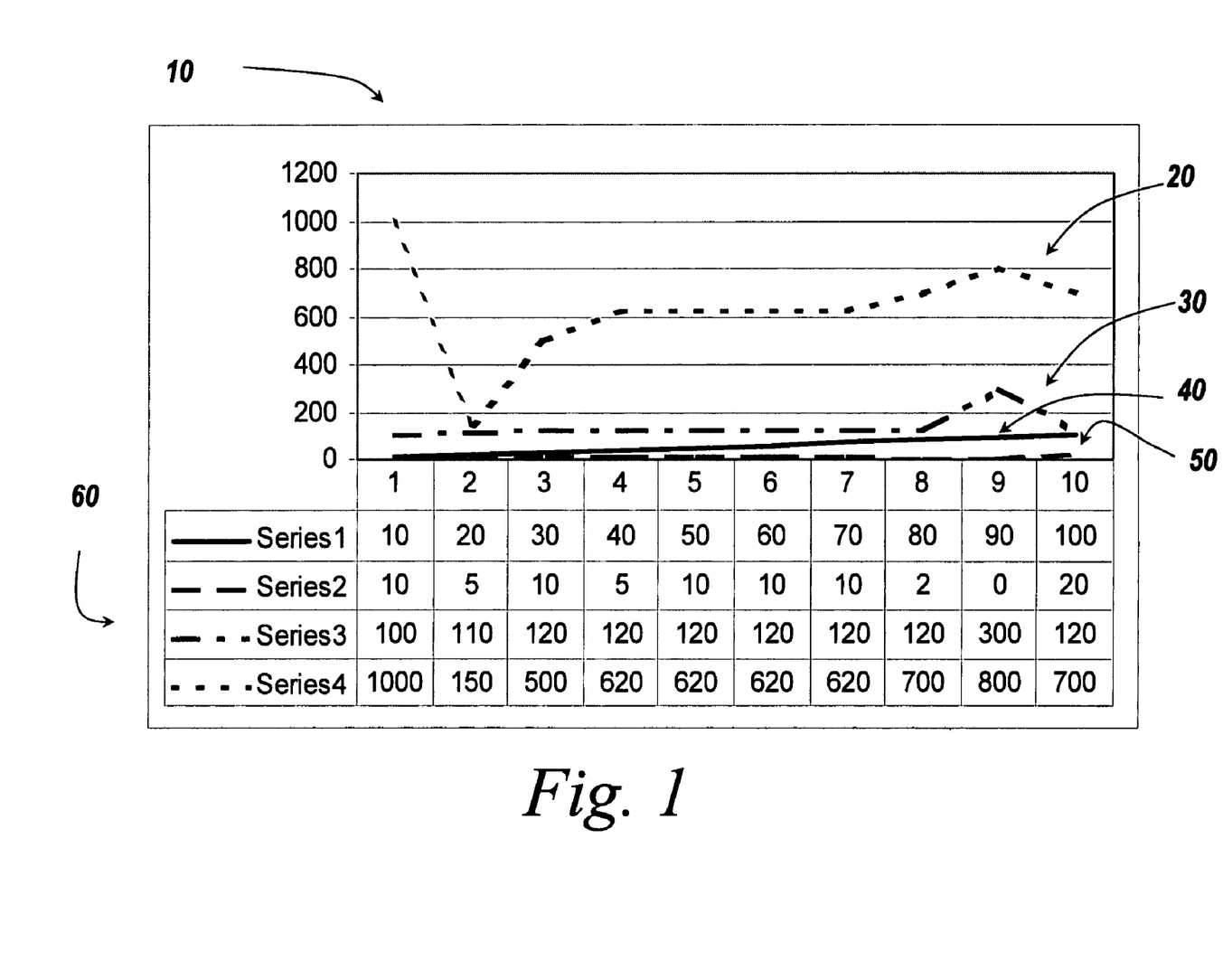
FIG. 1 is an example of a display of multiple groups of data.

With reference to FIG. 1, the display of multiple series of data is difficult when the Y scale of these signals varies wildly from signal to signal. According to the display 10 of FIG. 1, four series of data are shown by a first, second, third and fourth line 20, 30, 40, 50. A data table 60 indicates the data corresponding to the lines 20, 30, 40, 50. In the present example, each of the series of data represent time-varying signals. If all the signals are put on the same axes or if multiple axes are used on the same page, detail is lost. For example, the variation in many of the data series is difficult to see in the display 10.

Figure 2:
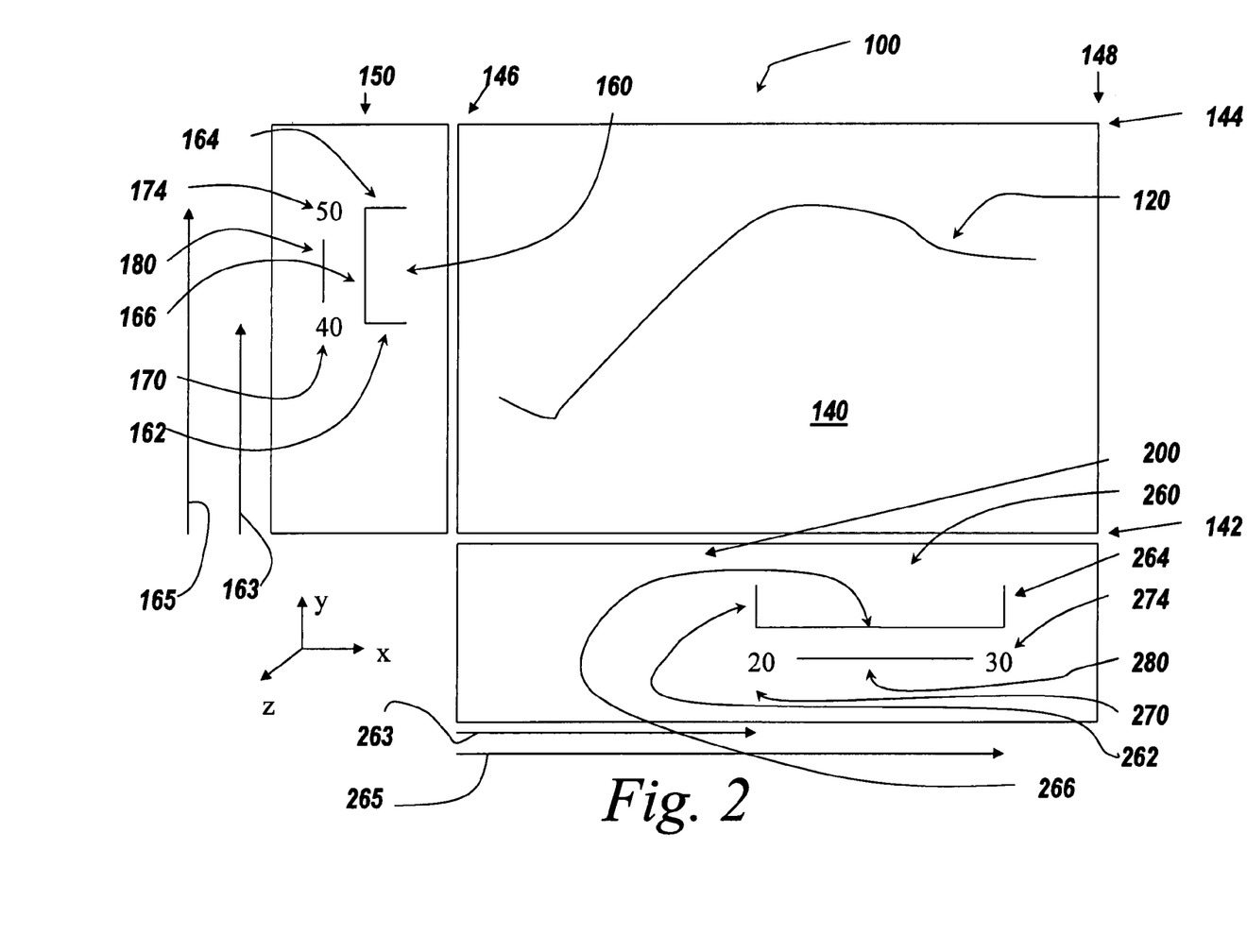
FIG. 2 is a schematic illustration of a graphical display according to an illustrative embodiment of the present invention.

FIG. 2 is a schematic illustration of an illustrative embodiment of the invention. A graphical display 100 is provided, including a graphical representation 120 of a group of data, such as a series of data. The data area 140 has a y data lower limit 142 and a y data upper limit 144 along a y-axis. An x data lower limit 146 and an x data upper limit 148 are also provided along an x-axis. Similar data lower and upper limits are provided along each of any number of additional data axes, such as an z-axis, if used. The data lower and upper limits apply only to the display of the data, and do not correspond to the lower and/or upper values of data in the data series.

A y-scale area 150 is provided for the y-scale information and controls to be provided. Similarly, an x-scale area 200 may also be provided. With reference to the y-scale area 150, a y-scale bracket 160 is provided for each of the data series having a graphical representation 120 in the data area 140. The data bracket 160 includes a lower tick mark 162 and an upper tick mark 164. An offset bar 166 is positioned between the lower tick mark 162 and the upper tick mark 164. The lower tick mark 162 corresponds to a lower offset from the y-data lower limit 142, illustrated for purposes of illustration only by lower offset arrow 163. The upper tick mark 164 corresponds to an upper offset from the y-data lower limit 142, illustrated for purposes of illustration only by upper offset arrow 165.

A lower scale value 170 is located near the lower tick mark 162. In the present example, the lower scale value 170 is 40. Therefore, the location of the lower tick mark 162 represents the location of the value of 40 on the y-axis for the graphical representation 120 of the data series corresponding to the data bracket 160. Similarly, the upper scale value 174, here a value of 50, denotes that the location of the upper tick mark 164 represents the location of the value of 50 on the y-axis for the graphical representation 120 of the data series corresponding to the data bracket 160. There is no need for the location of the graphical representation 120 to be within the lower and upper tick marks 162, 164. For example, the graphical representation 120, as shown in FIG. 2, illustrates that some of the data has a value corresponding to the y-axis of less than 40.

A combination bar 180 may also be provided near the y-scale bracket 160. The combination bar is illustrated by way of example as between the lower scale value 170 and upper scale value 174.

Optionally, an additional axis may also be provided with a scale area. In the present example, the x-scale area 200 is illustrated with a x-scale bracket 260, lower and upper tick marks 262, 264 and lower and upper scale values 270, 274. An offset bar 266 and combination bar 280 may also be provided. For purposes of illustration only, the lower offset arrow 263 and upper offset arrow 265 illustrate the offsets from the x-data lower limit 146 of the lower tick mark 262 and upper tick mark 264, respectively.

It is understood that the data area 140 and scale areas 150, 200 are illustrated with borders for discussion purposes only, and the borders may be omitted in the graphical display 100.

Figure 3:
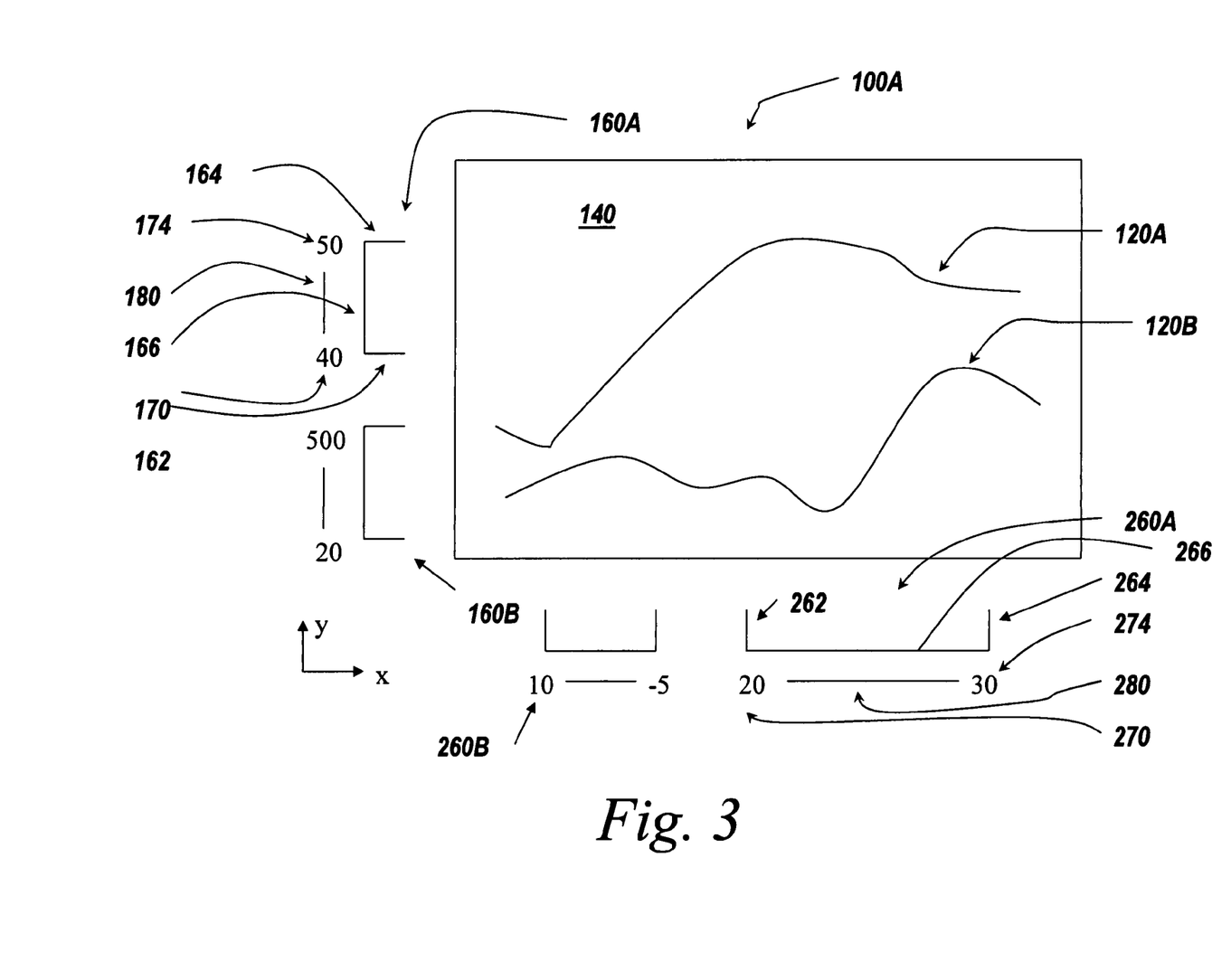
FIG. 3 is an example of a graphical display according to an illustrative embodiment of the present invention.

FIG. 3 illustrates a graphical display 100A according to an illustrative embodiment. FIG. 3 shows a first graphical representation 120A having a y-scale bracket 160A and a x-scale bracket 260A. A second graphical representation 120B is also shown and has a corresponding y-scale bracket 160B and a x-scale bracket 260B, each with associated tick marks, combined bars, offset bars and scale values.

In operation of the illustrative embodiments, the graphical representation 120 can be changed by user selection of components of the graphical display 100. For example, by moving either of the upper or lower tick marks 162, 164, 262, 264 along their axis, the scale of the graphical representation 120 corresponding to that axis is changed, as the location of the value on that axis as shown by the lower or upper scale value 170, 174, 270, 274 is changed by movement of the corresponding tick mark, and both the lower and upper scale value remain the same. The scale may even be inverted by moving the upper tick mark 164, 264 below the lower tick mark 162, 262. The scale of the graphical representation 120 relative to other axes remains unchanged.

The implementation of the scaling change resulting from the movement of the tick marks 162, 164, 262 or 264 along the respective axis will now be described herein relative to an implementation in which MATLAB from The MathWorks, Inc. of Natick, Mass. is employed. Nevertheless, those skilled in the art will appreciate that the present invention may be implemented in other environments.

MATLAB directs graphics output to a window that is separate from the command window. This window is referred to as the "figure window." MATLAB also provides handle graphic objects which are the basic drawing elements used by MATLAB to display data within a figure window. Included amongst these objects are axes objects. Axes objects define a region in a figure window and orient their children within the regions. The children may be of the image, light, line, patch, surface or text object varieties. For purposes of this discussion, the focus will be on the case wherein a line is a child of an axes. MATLAB defines a number of properties for such objects. Included within the properties is a ButtonDownFcn property which identifies a callback routine that executes when a button press occurs.

Each axis has a position property that controls the size and location of an axis within a figure window. A user may define the axis position as any rectangle and place this rectangle at a desired location within a figure. The axis position is defined as a vector [left bottom width height]. Left and bottom define a point in the figure window that locates the lower left corner of the axis rectangle. Width and height specify the respective dimensions of the axis rectangle. Multiple axes may be available per figure window. For each axis in an axes, a user may specify ranges, the location of tick marks along the axis and labels for the tick marks.

For the illustrative example shown in FIG. 3, separate axes are defined for graphical representation 120A and graphical representation 120b. The axes are invisible (i.e. not displayed in the figure). An invisible axis is defined also for each of the scale brackets.

Figure 4:
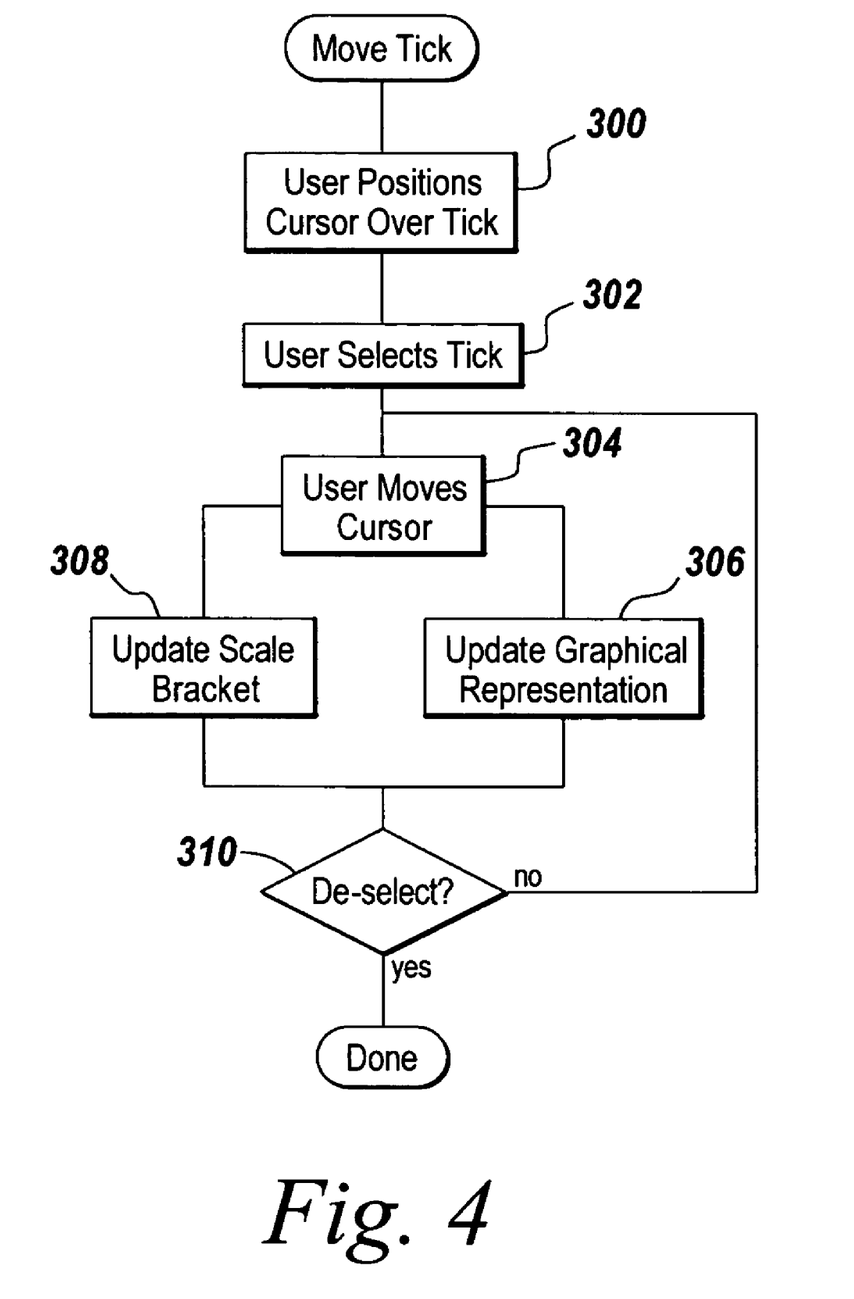
FIG. 4 is a flowchart illustrating the steps performed when a tick is moved in the illustrative embodiment of the present invention.

FIG. 4 provides a flowchart illustrating the steps that are performed when a user seeks to move one of the ticks in a scale bracket. Initially, a user positions a cursor (such as a mouse cursor) over one of the ticks on a scale bracket so that the hot spot of the cursor points to the tick (Step 300 in FIG. 4). This may be done using a number of input devices including pointing devices, such as a mouse, electronic tablet or light pen, or a keyboard. The user then selects the tick, such as by depressing a button, hitting a particular key on a keyboard or pressing a button with a light pen (Step 302 in FIG. 4). This selection may indicate that the user is about to initiate a drag operation. As was mentioned above, each axes object may specify a callback function that is called when a ButtonDown event occurs. Hence, a callback may be specified for the tick such that the callback function is called when the cursor is positioned over the tick and a ButtonDown event occurs. This callback function then handles the processing to update the scale bracket and associated plot as will be described in more detail below.

The user then manipulates the input device to move the cursor (Step 304 in FIG. 4). The movement of the cursor is an indication of a changing of the limit associated with a tick on the scale bracket. Accordingly, the visual depiction. of the scale bracket must be adjusted to indicate the change in the limit position (Step 308 in FIG. 4). The graphical representation (e.g. 120A) associated with the scale bracket must also be updated to be rescaled according to the change of scale indicated by the movement of the tick (Step 306 in FIG. 4). This updating may continue until a drop is indicated by a de-selection event, such as the release of a mouse button or other button typically associated with a drop as part of a drag and drop sequence (Step 310 in FIG. 4). If the user continues to move the cursor (See step 304 in FIG. 4), the scale bracket and plot are updated accordingly (See steps 308 and 306 in FIG. 4). If, however, a de-selection occurs, the process is complete and there is no need to modify the scale bracket or graphical representation further.

Those skilled in the art will appreciate that the flow chart in FIG. 4 shows an example wherein the scale bracket and graphical representation are dynamically updated during the drag and drop operation. It would be appreciated that in alternative embodiments, the scale and plot are not updated until the drop occurs. A movement of the tick mark modifies the position vector associated with an axes. For the example shown in FIG. 3, movement of tick mark 170 modifies the bottom value of the position vector and may also modify the height value of the position vector. Movement of the upper tick value 174 may modify the height value and the bottom values in the position vector. A modification of the ticks on the scale brackets 260A and 260B on the X axis may result in the modification of the width and left values of the position vector of the axes.

By moving the offset bar 166, 266 along its corresponding axis, the location of the lower and upper tick marks along that axis can be changed simultaneously. The lower and upper scale values corresponding to the lower and upper tick marks being moved remain the same, meaning the scale of the graphical representation 120 relative to that axis does not change, but the location of the graphical representation 120 within the data area 140 changes along that axis.

Figure 5:
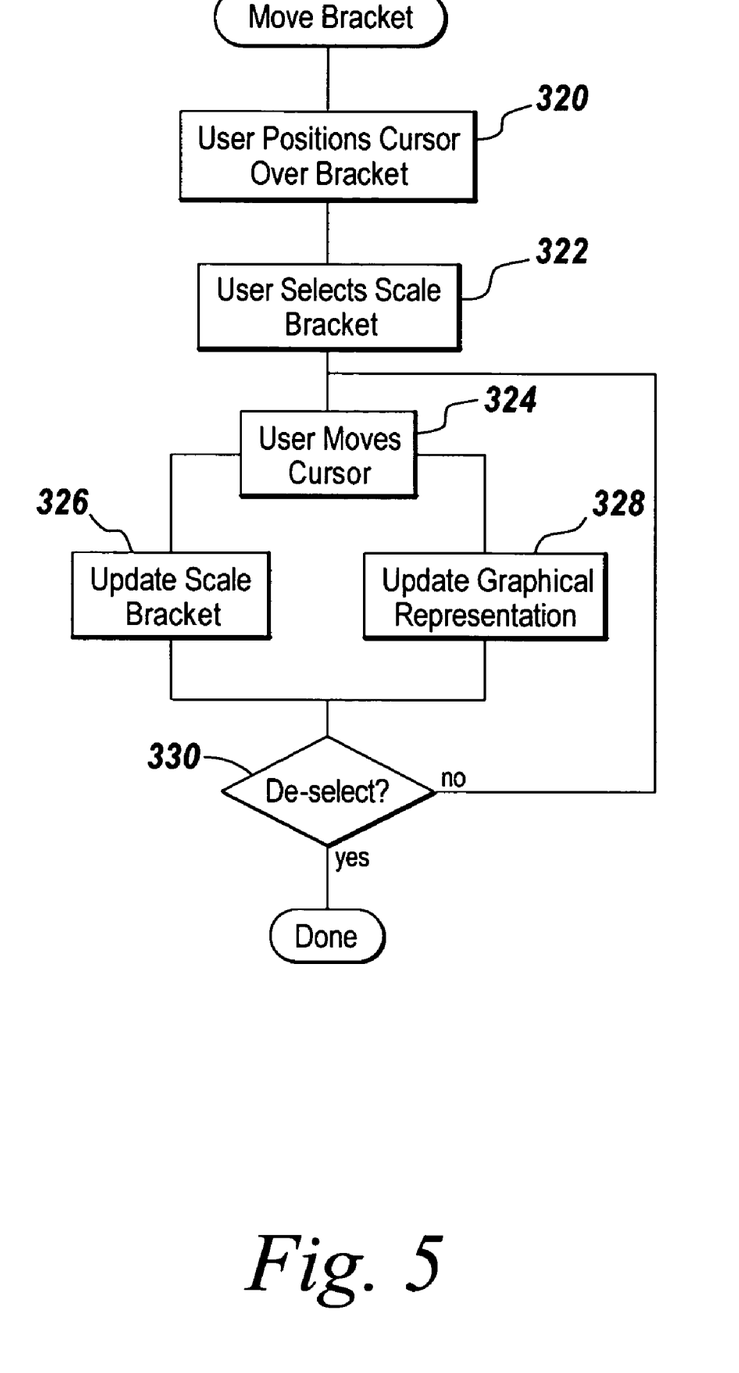
FIG. 5 is a flowchart illustrating the steps performed when a scale bracket is moved in the illustrative embodiment of the present invention.

FIG. 5 provides a flowchart of the steps performed to move the scale bracket. Initially, the user positions a cursor over the bracket (Step 320 in FIG. 5). The user then selects the scale bracket in a manner that is appropriate with the corresponding input device (e.g. depressing a mouse button) (Step 322 in FIG. 5). The user moves the cursor by manipulating the input device (Step 324 in FIG. 5). The user is dragging the bracket toward the new desired location. As the bracket is moved, the graphical representation is updated (Step 328 in FIG. 5). The graphical representation is updated by manipulating the X limits or Y limits properties for the axes associated with the graphical representation to change the X or Y scaling and then plotting. For a scale bracket on the y axis, the bottom values of the position vector is changed. For a scale bracket on the x axis, the left value in the position vector is changed. The scale bracket must also be redrawn to reflect the new position (Step 326 in FIG. 5). This is also done by manipulating the position vector for the axes associated with the scale bracket. This process continues as the user moves a cursor until a deselection occurs (Step 330 in FIG. 5).

A combination bar 180, 280 may be provided for additional control for the graphical representation 120 of the data. By moving the combination bar 180, 280 along its corresponding axis, the location of the lower and upper tick marks along that axis can be changed simultaneously. The lower and upper scale values corresponding to the lower and upper tick marks being moved also change accordingly, meaning the scale of the graphical representation 120 relative to that axis does not change and the location of the graphical representation 120 within the data area 140 remains the same. The combination bar 180, 280 makes arrangement of multiple scale brackets relative to each other easy. The steps performed relative to the graphical representation 120 and the scale bracket are largely the same as described above relative to FIG. 5. The combination bar, however, must also be updated.

Double clicking on the lower or upper scale value 170, 174, 270, 274 provides for editing of that lower or upper scale value. Changing the lower or upper scale value changes the value on the axis of the location of the corresponding lower or upper tick mark 162, 164, 262, 264. This results in changing the location and scale of the graphical representation 120 relative to the axis corresponding to the edited lower or upper scale value. A callback routine is provided that is called when such a double-clicking event occurs. This routine facilitates modification of the labels for the ticks on the scale bracket. It also changes the associated limit(s) for the axis and replots the plot based on the revised limit(s).

Figure 6:
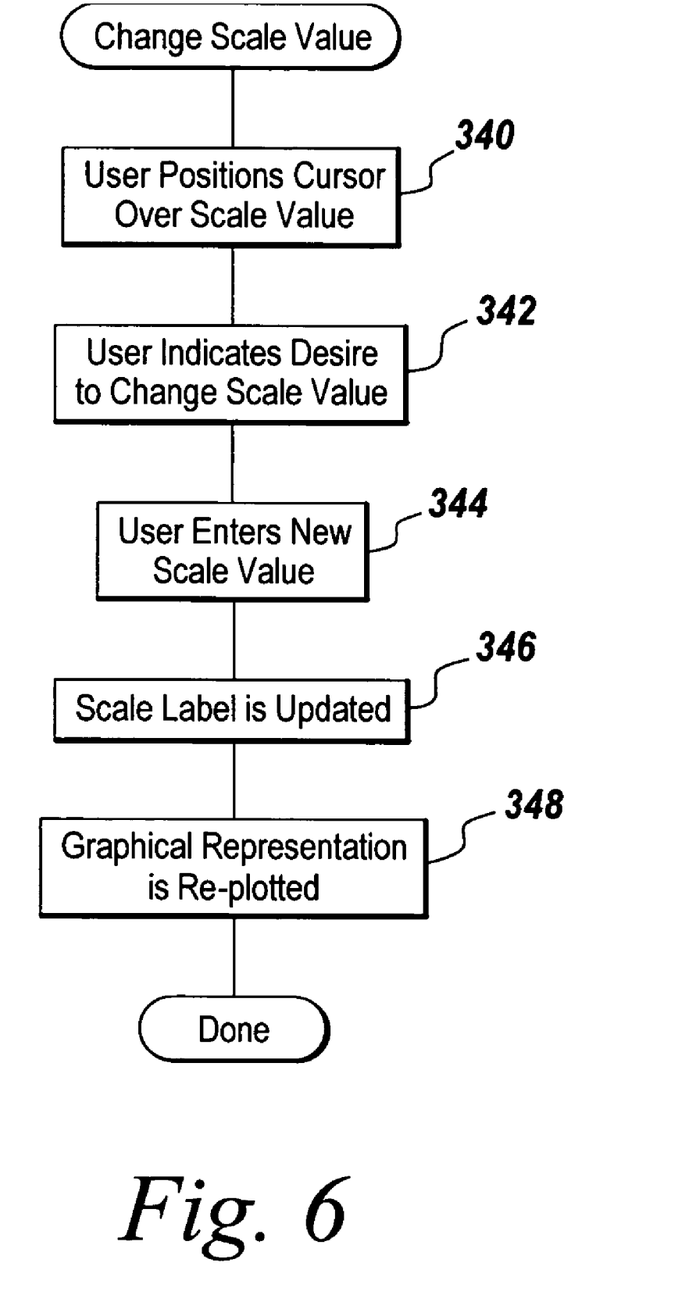
FIG. 6 is a flowchart illustrating the steps performed when a scale value is modified in the illustrative embodiment of the present invention.

FIG. 6 provides a flowchart of the steps that are performed when a user requests to change the scale values. Initially, the user positions a cursor over the scale value (Step 340 in FIG. 6). The user then indicates a desire to change a scale value by taking a designated action with the input device, such as double clicking a mouse button (Step 342 in FIG. 6). The user is provided an opportunity to enter the new scale value (such as by typing in a value on the keyboard) (Step 344 in FIG. 6). The label associated with a scale value is updated to correspond to the value entered by the user (Step 346 in FIG. 6). The graphical representation is re-plotted according to the updated scale (Step 348 in FIG. 6). In particular, the limit values on the axes may change to be updated and the graphical representation must be plotted accordingly.

Figure 7:
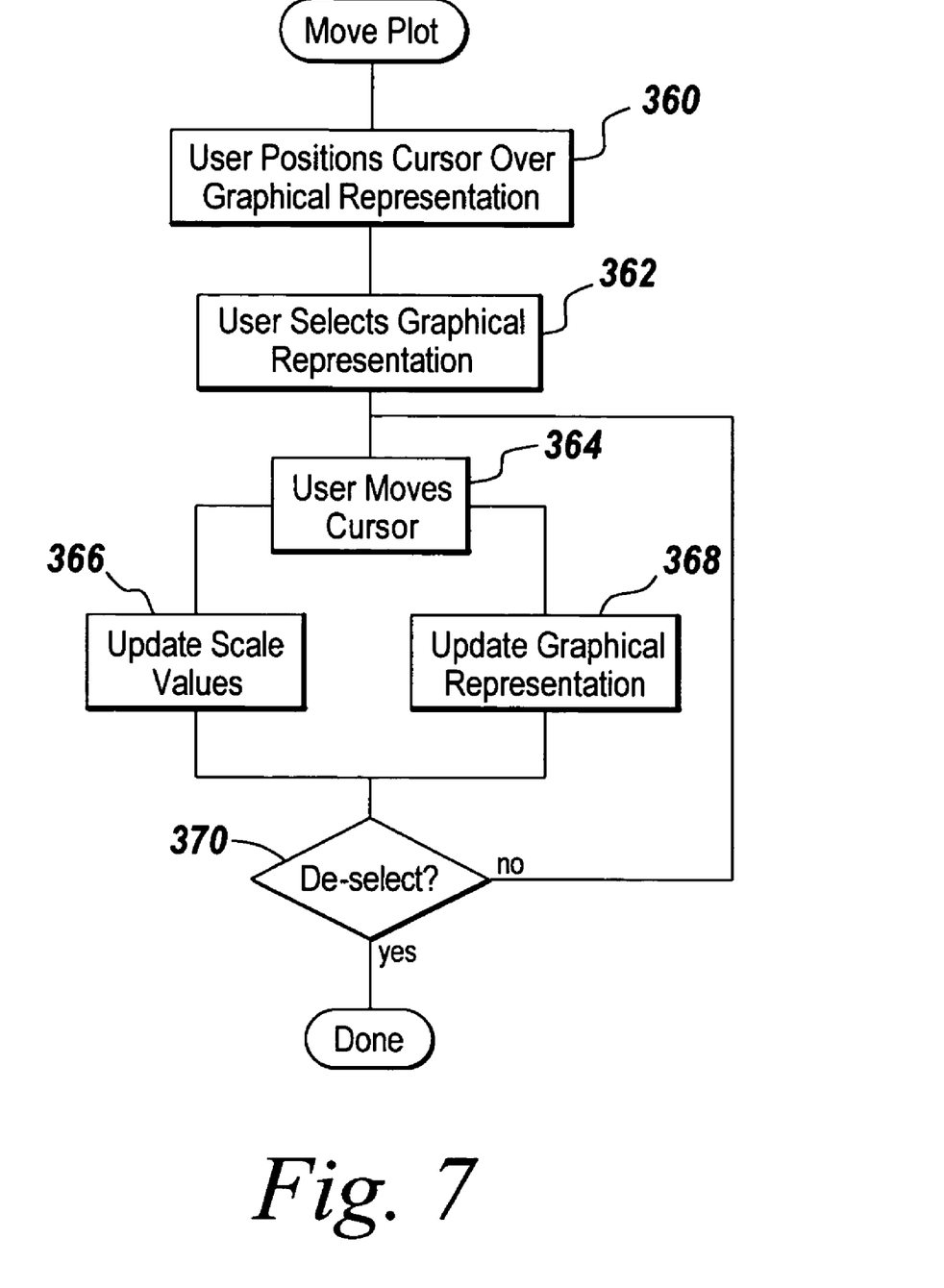
FIG. 7 is a flowchart illustrating the steps performed when a graphical representation is moved in the illustrative embodiment of the present invention.

Moving the graphical representation 120 along an axis changes the lower and upper scale values 170, 174, 270, 274, corresponding to that axis, but leaves the current location of the tick marks, and vertical lines in place. FIG. 7 illustrates the steps performed in the illustrative embodiment of the present invention when the user tries to move the graphical representation 120 along an axis. The user initiates the process for positioning the cursor over the graphical representation (Step 360 in FIG. 7). The user then selects the graphical representation, such as by depressing a mouse button (Step 362 in FIG. 7). The user moves the cursor to a new position along the axes by manipulating the input device (Step 364 in FIG. 7). If the user is using a mouse, the cursor is used by manipulating the mouse in the direction of the axes. When the user moves the cursor, the scale values must be updated so they will reflect the appropriate scale values relative to the offset to the graphical representation (Step 366 in FIG. 7). In other words, the scale values must be modified to indicate the appropriate scale values given the position of the scale bracket relative to the new position of the graphical representation. The appropriate scale values are determined by resolving an expression. The graphical representation is also updated to the new position (Step 368 in FIG. 7). This process is repeated until a deselection (Step 370 in FIG. 7) occurs, such as by a user releasing a mouse button.

According to an embodiment, the invention can provide for coupling of adjustment of user selections, such as tick marks, offset bars scale values and combination bars, among graphical representations. For instance, multiple graphical representations may be adjusted simultaneously along an axis. In one example, an x-axis may be a time axis that is common to all of the graphical representations. By coupling adjustment of user selections among graphical representations, all of the among graphical representations could be adjusted simultaneously relative to the x-axis. Coupling of adjustment of user selections may be done by providing part or all of an additional set of user selections, such as tick marks, offset bars scale values and combination bars and/or by the use of a keyboard entry. For example, by holding down a Shift, Cntrl or Alt key when selecting a user selection, such as tick marks, offset bars scale values and combination bars, the action taken upon that user selection may be used to effect action upon other and/or all of the graphical representations relative to that axis. It is understood that providing for coupling of adjustment of user selections may also be combined with retaining individual user selections for each of the graphical representations.

Those skilled in the art will appreciate that updated scale values and the update of the graphical representation need not occur dynamically but rather may occur at the end of the drag and drop event in alternative embodiments. It is understood that the graphical representation could be moved relative to multiple axes simultaneously.

It is understood that the invention may be implemented in a wide variety of methods. For example movement of various items may be done by, for example, dragging, dragging and dropping and the like. Although "double clicking" is used in describing the illustrative embodiment, implementation of the invention may be done in a variety of ways. Examples of alternatives of movement and/or selection of items include, but are not limited to the use of keyboard entries that enable a user selection to rescale the graphical representation of data and single clicking to select entries. Also, the phrase "along the axis" is meant to represent movement parallel to an axis, or movement having a component that is parallel to an axis.

According to the operation of the illustrative embodiment, the user selection of a control to rescale the graphical representation of data does not require rescaling of the underlying data. Therefore, no loss of precision results from changing the data values and large data sets can be used without need of extensive processing to change all of the data in the data set.

According to an embodiment of the invention, the user can interactively modify the scale of the graphical representation by user selection of one or more of the controls, thereby providing rescaling during and in direct response to dragging of the control.

In some implementations, the data area 140 may be formed of one or more data axes and/or the scale areas 150, 200 may be formed of multiple scale axes. In such an implementation, each of the axes may be considered an object within an object-oriented programming environment. Each graphical representation may also be considered an object.

While the user selections, such as tick marks, offset bars scale values and combination bars are illustrated as to the left and below the data area 140, the invention is not so limited. The user selections may also be provided to the right and above the data area 140 and moveable by the user. Gridlines may be provided to aid in viewing of the graphical representations of the data.

The various user selections may be implemented as callbacks added to each item, such as tick marks, offset bars scale values, combination bars and/or the graphical representations 120 themselves. For example, upon a button down function, a mouse location can be determined. The current location of the mouse relative to an axis can then be determined to determine the desired amount of rescaling and/or repositioning.

Optionally, upon user selection of an item, the item will have a visual affordance to denote its selection. For example, the item may be bolded and/or change color. Also, additional items, such as numeric indications of the data lower limit and data upper limit may be shown upon user selection of an item corresponding to the graphical representation and selected axis. A label for the data group may be provided proximate to the scale bracket, combined bar or offset bar.

Additional features can be provided, such as providing the data corresponding to a point on the graphical representation by hovering over the point. Also, functionality associated with the user selection may be textually indicated by hovering over the user selection. Stacked undo may be provided, enabling recent actions to be undone. Snap to increment may also be provided for rescaling a data set to aid in selecting lower or upper scale values to specific increments during movement of the lower or upper tick marks. Minor tick marks (not shown) may also be included between the lower and upper tick marks.

Also, the groups of data may correspond to abstract variables in a principal component analysis. It is understood that the axes may represent a wide variety of numerical or other values. For example, the invention may be used with linear scaling, logarithmic scaling or bar charts. Bar charts may have only a single axis upon which rescaling would apply. The graphical display of the present invention may also be implemented in a graphical modeling environment.

Upon creation of the graphical display, each axis can be divided such that the scale brackets are sized to be approximately 1/n, where n is the number of groups of data to be displayed. The lower scale values and upper scale values can be selected to provide for each graphical representation to extend virtually from the data lower limit to the data upper limit.

Figure 8:
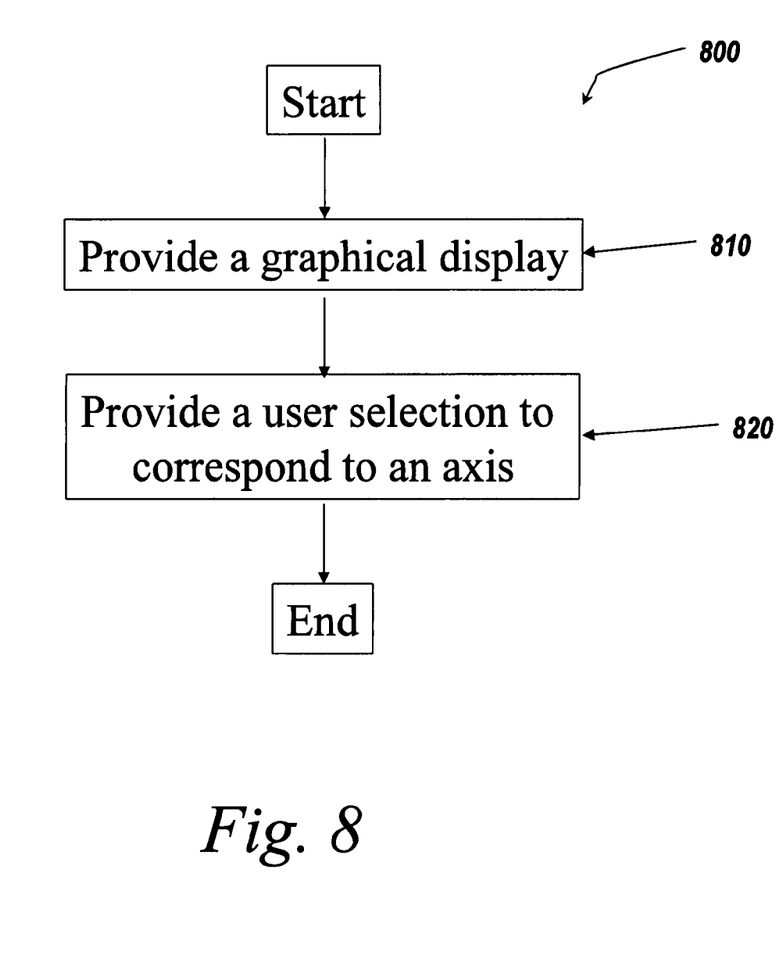
FIG. 8 is a flowchart of a method performed according to an embodiment of the present invention.

According to an embodiment of the invention, a method 800 is illustrated in FIG. 8. The method 800 includes providing 810 a graphical display. The graphical display includes a graphical representation of a group of data. A user selection is also provided 820 to correspond to an axis. Movement of the user selection relative to the axis to changes the graphical representation of the group of data. Changes of the graphical representation can include rescaling of the graphical representation relative to the axis and/or movement of the graphical representation relative to the axis.

Figure 9:
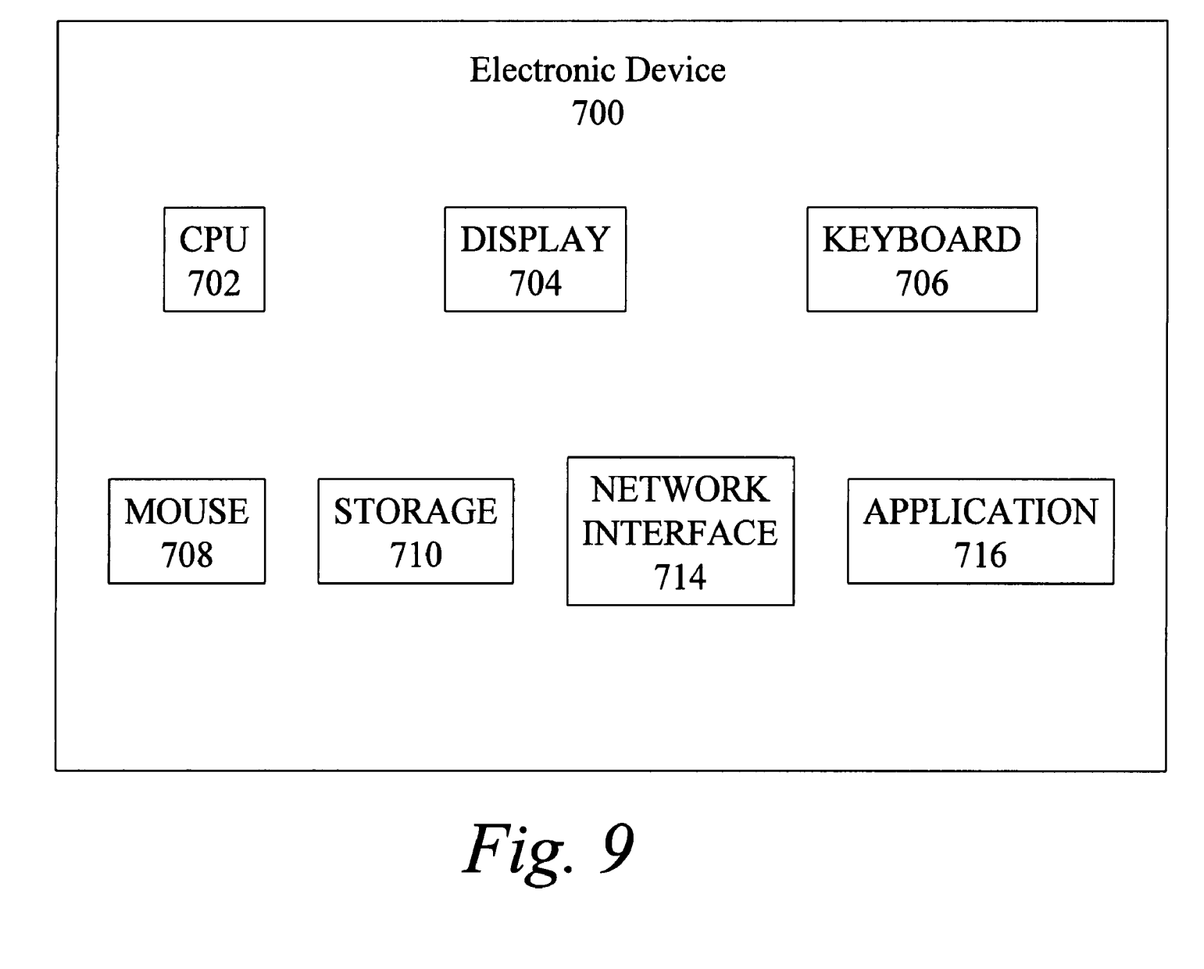
FIG. 9 a diagrammatic illustration of an electronic device for use in implementing the present invention.

The present invention can be implemented on an electronic device. FIG. 9 illustrates one example embodiment of an electronic device 700 suitable for practicing the illustrative embodiments of the present invention. The electronic device 700 is representative of a number of different technologies, such as personal computers (PCs), laptop computers, workstations, personal digital assistants (PDAs), Internet appliances, cellular telephones, wireless devices, and the like. In the illustrated embodiment, the electronic device 700 includes a central processing unit (CPU) 702 and a display device 704. The display device 704 enables the electronic device 700 to communicate directly with a user through a visual display. The electronic device 700 further includes a keyboard 706 and a mouse 708. Other potential input devices not depicted include a stylus, trackball, joystick, touch pad, touch screen, and the like. The electronic device 700 includes storage device 710 for storing data and instructions. The storage device 710 can include, but is not limited to, such technologies as a floppy drive, hard drive, tape drive, optical drive, read only memory (ROM), random access memory (RAM), and the like. Applications such as browsers, JAVA virtual machines, C compilers, and other utilities and applications can be resident on the storage device 710. The electronic device 700 can also include a network interface 714 for communicating with one or more electronic devices external to the electronic device 700 depicted. Modems and Ethernet cards, are examples of network interfaces 714 for establishing a connection with an external electronic device or network. The CPU 702 has either internally, or externally, attached thereto one or more of the aforementioned components. In addition to applications previously mentioned, graphic display, simulation and/or modeling applications 716, such as MATLAB®, or Simulink®, can be installed and operated on the electronic device 700.

It should be noted that the electronic device 700 is merely representative of a structure for implementing the present invention. However, one of ordinary skill in the art will appreciate that the present invention is not limited to implementation on only the described device 700. Other implementations can be utilized, including an implementation based partially or entirely in embedded code, where no user inputs or display devices are necessary. In such an instance, a processor can communicate directly with another processor, or other device.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. A computer storage device storing computer executable instructions, the storage device comprising:
   instructions for providing a graphical display including a first graphical representation of a first group of data and a second graphical representation of a second group of data;
   instructions for providing a first user selections corresponding to the first graphical representation along a first portion of a first axis;
   instructions for providing a second user selection corresponding to the second graphical representation along a second portion of the first axis;
   instructions for changing the first graphical representation in response to movement of the first user selection relative to the first axis; and
   instructions for changing the second graphical representation in response to movements of the second user selection relative to the first axis.

2. The storage device of claim 1, wherein the first user selection is a selection of an upper tick mark that, when moved, changes an upper offset corresponding to the first graphical representation.

3. The storage device of claim 1, wherein the first user selection is a selection of a lower tick mark that, when moved, changes a lower offset corresponding to the first graphical representation.

4. The storage device of claim 1, wherein the first user selection is a selection of an offset bar that, when moved, changes both an upper offset and a lower offset corresponding to the first graphical representation.

5. The storage device of claim 1, wherein the first user selection is a selection of a combination bar that, when moved, changes both an upper offset and a lower offset and both an upper scale value and a lower scale value corresponding to the first graphical representation.

6. The storage device of claim 1, wherein the first user selection is a selection of the first graphical representation of the first group of data that, when moved, changes both an upper scale value and a lower scale value.

7. The storage device of claim 1, wherein movement of the first user selection comprises movement by dragging.

8. The storage device of claim 7, further comprising:
   instructions for interactive resealing of the first graphical representation of the first group of data in response to movement of the first user selection.

9. The storage device of claim 1, wherein movement of the first user selection comprises movement by keyboard entry.

10. The storage device of claim 1, wherein the first group of data is a series of data.

11. The storage device of claim 1, wherein the second user selection is a selection of an upper tick mark that, when moved, changes an upper offset corresponding the second graphical representation, without changing the first graphical representation.

12. The storage device of claim 1, wherein the second user selection is a selection of a lower tick mark that, when moved, changes a lower offset corresponding to the second graphical representation, without changing the first graphical representation.

13. The storage device of claim 1, when the second user selection is a selection of a scale bracket, wherein movement of the scale bracket along the first axis is performed by movement of an offset bar that, when moved, changes both an upper offset and a lower offset corresponding to the second graphical representation, without changing the first graphical representation.

14. The storage device of claim 1, wherein the second user selection is a selection of a combination car that, when moved, changes both an upper offset and a lower offset and both an upper scale value and a lower scale value corresponding to the second graphical representation.

15. The storage device of claim 1, further comprising:
   instructions for changing the graphical representation of the first group of data and the graphical representation of the second group of data in response to movement of a third user selection relative of the first axis.

16. The storage device of claim 1, wherein movement of the second user selection does not change the second group of data.

17. The storage device of claim 1, wherein movement of the first user selection does not change the first group of data.

18. The storage device of claim 1, further comprising:
instructions for changing the first graphical representation of the first group of data relative to a second axis by movement of a third user selection relative to the second axis.

19. The storage device of claim 1, where the graphical display is provided in a graphical modeling environment.

20. A method for dynamically controlling graphical representations of data, comprising:
displaying a graphical display including a first graphical representation of a first group of data and a second graphical representation of a second group of data;
displaying a first user selection corresponding to the first graphical representation along a first portion of a first axis and a second user selection corresponding to the second graphical representation along a second portion of the first axis;
changing the graphical representation of the first group of data in the display in response to movement of the first user selection relative to the first axis, and
changing the second graphical representation of the second group of data in the display in response to movement of the second user selection relative to the first axis.

21. The method of claim 20, wherein the first user selection is a selection of an upper tick mark that, when moved, changes an upper offset corresponding to the first graphical representation.

22. The method of claim 20, wherein the first user selection is a selection of a lower tick mark that, when moved, changes a lower offset corresponding to the first graphical representation.

23. The method of claim 20, wherein the first user selection is a selection of an offset bar that, when moved, changes both an upper offset and a lower offset corresponding to the first graphical representation.

24. The method of claim 20, wherein the first user selection is a selection of a combination bar that, when moved, changes both an upper offset and a lower offset and both an upper scale value and a lower scale value corresponding to the first graphical representation.

25. The method of claim 20, wherein the first user selection is a selection of the first graphical representation of the first group of data that, when moved, changes both an upper scale value and a lower scale value.

26. The method of claim 20 wherein movement of the first user selection results in interactive resealing of the first graphical representation of the first group of data in response to movement of the first user selection.

27. The method of claim 20, wherein the first group of data is a series of data.

28. The method of claim 20, wherein the second user selection is a selection of an upper tick mark that, when moved, changes an upper offset corresponding to the second graphical representation, without changing the first graphical representation.

29. The method of claim 20, wherein the second user selection is a selection of a lower tick mark that, when moved, changes a lower offset corresponding to the second graphical representation, without changing the first graphical representation.

30. The method of claim 20, wherein the second user selection is a selection of a scale bracket, wherein movement of the scale bracket along the first axis is performed by movement of an offset bar that, when moved, changes both an upper offset and a lower offset corresponding to the second graphical representation, without changing the first graphical representation.

31. The method of claim method 20, wherein the second user selection is a selection of a combination bar that, when moved, changes both an upper offset and a lower offset and both an upper scale value and a lower scale value corresponding to the second graphical representation.

32. The method of claim 20, further comprising:
changing the first graphical representation of the first group of data and the second graphical representation of the second group of data in response to movement of a third user selection relative to the first axis.

33. The method of claim 20, further comprising:
changing the first graphical representation of the first group of data relative to a second axis by movement of a third user selection relative to the second axis.

34. The method of claim 20, wherein the graphical display is provided in a graphical modeling environment.

* * * * *

UNITED STATES PATENT AND TRADEMARK OFFICE
CERTIFICATE OF CORRECTION

| | | |
|---|---|---|
| PATENT NO. | : 7,369,127 B1 | Page 1 of 1 |
| APPLICATION NO. | : 10/914819 | |
| DATED | : May 6, 2008 | |
| INVENTOR(S) | : Doug Hull | |

It is certified that error appears in the above-identified patent and that said Letters Patent is hereby corrected as shown below:

In the specification, in the detailed description section, in the printed patent, at column 3, line number 7, please change "data represent" to --data represents--

In the specification, in the detailed description section, in the printed patent, at column 3, line number 21, please change "an z-axis" to --a z-axis--

In the specification, in the detailed description section, in the printed patent, at column 3, line number 61, please change "a x-scale" to --an x-scale--

In the specification, in the detailed description section, in the printed patent, at column 4, line number 6, please change "and a" to --and an--

In the specification, in the detailed description section, in the printed patent, at column 4, line number 9, please change "and a x-scale" to --and an x-scale--

In the specification, in the detailed description section, in the printed patent, at column 5, line number 67, please change "vector is" to --vector are--

In the specification, in the detailed description section, in the printed patent, at column 9, line number 23, please change "Ethernet cards, are" to --Ethernet cards are--

In the claims section, claim number 8, in the printed patent, at column 10, line number 32, please change "resealing" to --rescaling--

In the claims section, claim number 26, in the printed patent, at column 12, line number 6, please change "resealing" to --rescaling--

Signed and Sealed this

Second Day of September, 2008

JON W. DUDAS
*Director of the United States Patent and Trademark Office*